US008205039B2

(12) United States Patent
Nagao et al.

(10) Patent No.: US 8,205,039 B2
(45) Date of Patent: Jun. 19, 2012

(54) NONVOLATILE SEMICONDUCTOR MEMORY DEVICE

(75) Inventors: Osamu Nagao, Kanagawa-ken (JP); Hitoshi Shiga, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 209 days.

(21) Appl. No.: 12/725,519

(22) Filed: Mar. 17, 2010

(65) Prior Publication Data

US 2010/0241794 A1    Sep. 23, 2010

(30) Foreign Application Priority Data

Mar. 18, 2009   (JP) ................................ 2009-066645
Jun. 11, 2009   (JP) ................................ 2009-139942

(51) Int. Cl.
*G06F 12/00*    (2006.01)
(52) U.S. Cl. .......... 711/103; 711/E12.001; 711/E12.008
(58) Field of Classification Search .................. 711/103, 711/E12.001, E12.008
See application file for complete search history.

(56) References Cited

U.S. PATENT DOCUMENTS

2003/0007388 A1    1/2003    Kawai et al.
2004/0062099 A1    4/2004    Hosono et al.

*Primary Examiner* — Yong Choe
(74) *Attorney, Agent, or Firm* — Oblon, Spivak, McClelland, Maier & Neustadt, L.L.P.

(57) ABSTRACT

A nonvolatile semiconductor memory device according to one aspect of the present invention includes: a memory cell array provided to perform programming in page units; and a control circuit provided to control the programming. The control circuit includes: means that performs a first detection for memory cells in a part provided as a unit smaller than a page, concurrently with programming to memory cells to be written in a page; and means that subjects the memory cells in the page to a second detection that takes into consideration a failure relief due to a redundant region, when the number of memory cells of unwritten state in the part as detected by the first detection becomes equal to or less than a first constant, and that ends the program operation when the number of memory cells of unwritten state in the page becomes equal to or less than a second constant.

5 Claims, 10 Drawing Sheets

| Detect Level | P | V1 | V2 | V3 | P | V1 | V2 | V3 | P | V2 | V3 | P | V2 | V3 | P | V3 | P | End |
|---|---|---|---|---|---|---|---|---|---|---|---|---|---|---|---|---|---|---|
| | | 1 | | | | | | | | 2 | | | | | 3 | | | |
| V1 Fail 1/N | Fail # > Allowable # | | | | | | | | | | | | | | | | | |
| V1 Detect | Fail | | | | | | | | | | | | | | | | | |
| V2 Fail 1/N | | | | | Fail # > Allowable # | | | | | Fail # ≤ Allowable # | | | | | | | | |
| V2 Detect | | | | | Fail | | | | | Pass | | | | | | | | |
| V3 Fail 1/N | | | | | | | | | Fail # > Allowable # | | | | | | Fail # ≤ Allowable # | | | |
| V3 Detect | | | | | | | | | Fail | | | | | | Pass | | | |

Fig.8

|  | Pgm | Verify 1 | Verify 2 | Verify 3 | Detection Times |
|---|---|---|---|---|---|
| 2nd Embodiments | 7 | 3 | 5 | 7 | 3 |
| 3rd Embodiments | 7 | 3 | 5 | 7 | 1 |
| 4th Embodiments | 7 | 2 | 4 | 6 | 0 |
| 5th Embodiments | 7 | 2 | 4 | 6 | 1 |

Fig.10

NONVOLATILE SEMICONDUCTOR MEMORY DEVICE

CROSS-REFERENCE TO RELATED APPLICATION

This application is based upon and claims the benefit of priority from the prior Japanese Patent Application No. 2009-66645, filed on Mar. 18, 2009 and Japanese Patent Application No. 2009-139942, filed on Jun. 11, 2009, the entire contents of which are incorporated herein by reference.

BACKGROUND OF THE INVENTION

The present invention relates to a program detection technique for nonvolatile semiconductor memory devices. In the program detection of a NAND flash memory as an example of nonvolatile semiconductor memory devices, programming and first detections are repeated a predetermined number of times until programming of the memory cells to be written in a page is completed (loop 1). When programming is not completed after a predetermined number of programming, a second detection is performed that takes into consideration a failure relief due to a redundant region.

The second detection detects the number of failures in a page or in a unit of correction (segment) due to the redundant region, during a time period in which programming and the confirmation of a threshold value for the memory cells are not performed. Programming is ended when the number of failures is within an allowable range. Programming is performed again when the number of failures is equal to or greater than the allowable number.

However, because the programming and detection concurrently proceeds in the first detection, the passing of detection always accompanies one extra unnecessary programming. This can be prevented by setting a smaller value for the predetermined number, so that the programming does not end in the first detection. However, in this case, the sequence must return to the loop 1 if the second detection is not passed. This increases the number of detections and accordingly increases program time.

BRIEF SUMMARY OF THE INVENTION

The present invention proposes a technique to reduce program time through optimization of the end detection method for the program operation.

A nonvolatile semiconductor memory device according to one aspect of the present invention includes: a memory cell array provided to perform programming in page units; and a control circuit provided to control the programming. The control circuit includes: means that performs a first detection for memory cells in a part provided as a unit smaller than the page, concurrently with programming to memory cells to be written in the page; and means that subjects the memory cells in the page to a second detection that takes into consideration a failure relief due to a redundant region, when the number of memory cells of unwritten state in the part as detected by the first detection becomes equal to or less than a first constant, and that ends the program operation when the number of memory cells of unwritten state in the page becomes equal to or less than a second constant.

In this way, the present invention provides a technique to reduce program time through optimization of the end detection method for the program operation.

BRIEF DESCRIPTION OF THE DRAWINGS

FIG. 8 is a chart describing program operation and a detection method of a multi-level product according to a fourth embodiment of the present disclosure;

FIG. 10 is a chart summarizing the number of program operations and detections of the second through fifth embodiments according to an exemplary embodiment of the present disclosure;

DETAILED DESCRIPTION OF THE INVENTION

First Embodiment

The following specifically describes an embodiment of the present invention with reference to the attached drawings.

1. Overview

In a program detection according to one aspect of the present invention, a first detection is performed for the memory cells in a part provided as a unit smaller than a page, concurrently with the programming for the memory cells to be written in a page. The programming and the first detection are repeated, and when the number of memory cells of unwritten state in the part becomes equal to or less than an allowable number for the part, a second detection is performed that takes into consideration a failure relief due to a redundant region.

The second detection detects the number of failures in a page or in a unit of correction (segment) due to the redundant region, during a time period in which programming and the confirmation of a threshold value for the memory cells are not performed. Programming is ended when the number of failures is within an allowable range. Programming is performed again when the number of failures is equal to or greater than the allowable number. In such program detections, because the programming does not end in the first detection, no unnecessary programming is performed. Further, with the number of memory cells of unwritten state in a part equal to or less than an allowable number for the part, it is likely that the number of memory cells of unwritten state in a page is also equal to or less than an allowable number for the page because of the programming proceeding with the first detection.

Accordingly, only one second detection will be likely to be required. This eliminates the need for an unnecessary second detection, thereby reducing program time.

Figure 1:
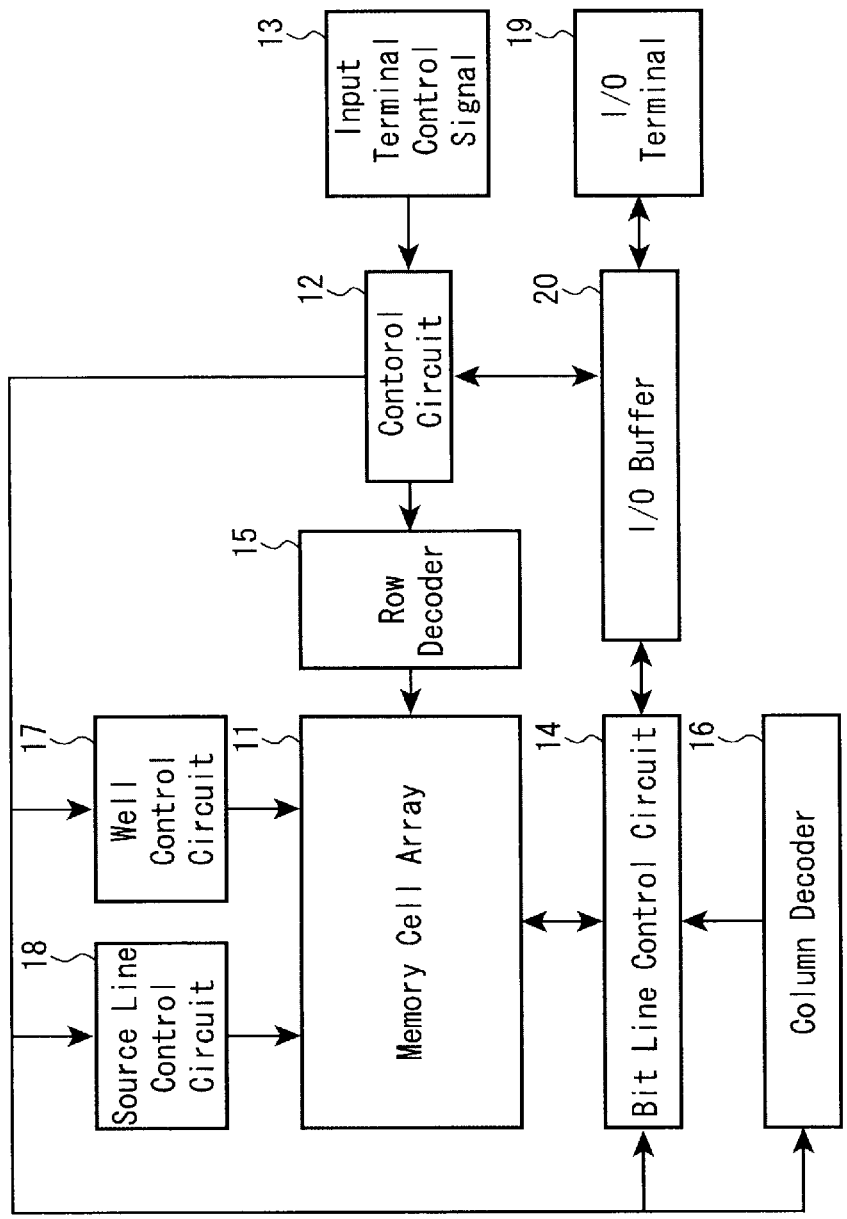
FIG. 1 is a block diagram illustrating a structure of a NAND flash memory according to an exemplary embodiment of the present disclosure.

FIG. 1 is a block diagram illustrating a structure of a NAND flash memory according to an exemplary First Embodiment of the present invention. Reading and programming of data to a memory cell array 11 are performed on a page basis. A control circuit 12 receives an input terminal control signal 13, and controls the operations of a bit line control circuit 14, a row decoder 15, a column decoder 16, a well control circuit 17, and a source line control circuit 18. In a program operation, the bit line control circuit 14 latches program data.

Figure 2:
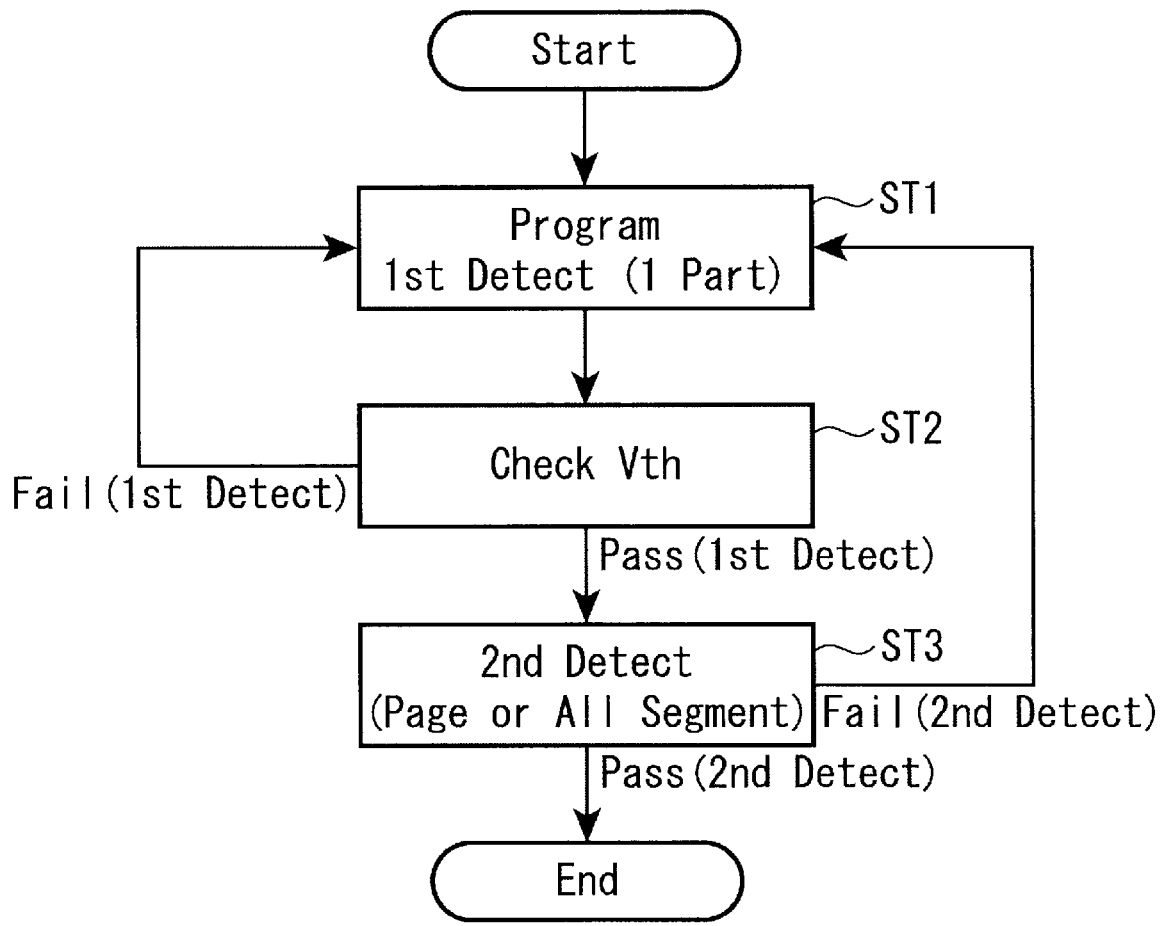
FIG. 2 is a flowchart describing an end detection method for program operation with respect to memory cells according to an exemplary embodiment of the present disclosure.

With reference to the flowchart shown in FIG. 2, the following describes an end detection method for the program operation with respect to the memory cells. First, a data input/output terminal 19 inputs program data for one page to the bit line control circuit 14 via a data input/output buffer 20. The program data for one page is latched by the bit line control circuit 14. Programming is then performed based on this program data (Step ST1). Programming is performed for the entire page. Programming is performed for, for example, program memory cells corresponding to program data "0", and is not performed for non-program memory cells corresponding to program data "1".

After programming, a threshold value is confirmed (Step ST2). The confirmation of a threshold value is performed by a verify read. A threshold value is conformed for the entire page. For example, upon completion of the programming for the memory cells of unwritten state, the program data corresponding to these memory cells is varied from "0" to "1" in the bit line control circuit 14 based on the read data resulting from the verify read.

Concurrently with the programming and the confirmation of a threshold value, a first detection is performed for the program data for one page latched in the bit line control circuit 14 (Step ST1).

The first detection detects the number of memory cells of unwritten state in a part, a unit smaller than a page. Since the program data "0" means an unwritten state, the detection can be made by detecting the number of program data "0".

Figure 3:
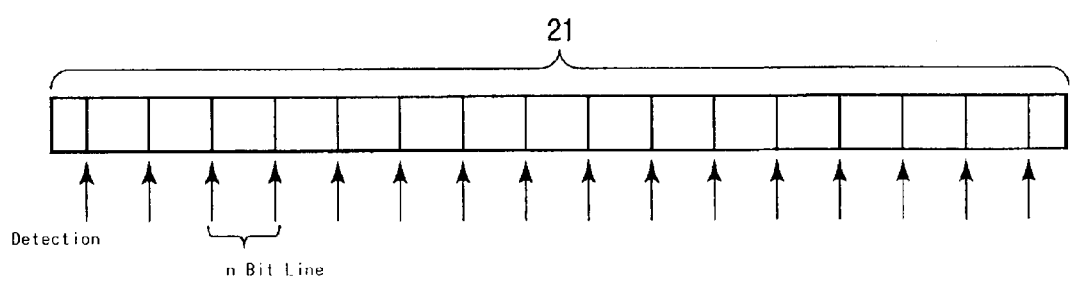
FIG. 3 is a schematic diagram of a collection of memory cells according to an exemplary embodiment of the present disclosure.

As used herein, the term "part" refers to a collection of memory cells selected at the intervals of n bit lines (n is any natural number) in a page 21, as represented in FIG. 3. By using the program data corresponding to the memory cells of n bit line intervals, the number of memory cells of unwritten state in the page 21 can be averagely detected.

Alternatively, a "part" may be a collection of a certain number of memory cells randomly selected from the page 21.

Figure 4:
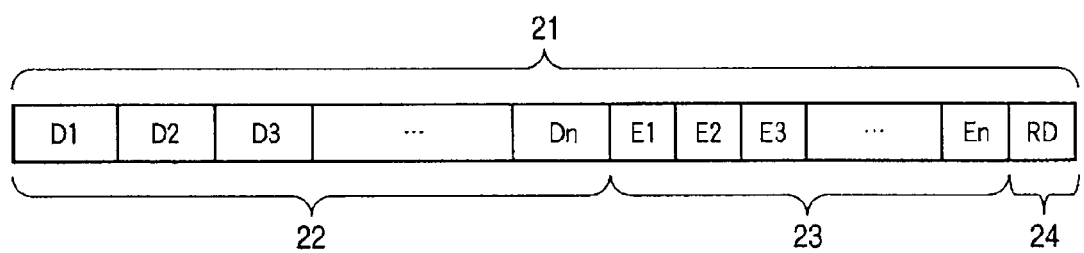
FIG. 4 is a schematic drawing of a bit line control circuit according to an exemplary embodiment of the present disclosure.

The bit line control circuit 14, as depicted in FIG. 4, is divided into a data region 22, a redundant region 23, and a replacement region. The data region 22 is further divided into a plurality of regions D1 to Dn, and the redundant region 23, provided to correct these regions, is divided into E1 to En.

A region defined by one of the sub-regions or a plurality of sub-regions of the data region 22 is called a segment, and one of the segments or a plurality of selected such segments may be used as a part. When selecting a segment, a segment with the largest number of memory cells of unwritten state may be selected.

When the number of memory cells of unwritten state in a part is greater than a first constant, the sequence returns to Step ST1. When the number of memory cells of unwritten state in a part is equal to or less than the first constant, the sequence goes to the second detection.

As used herein, the "first constant" is, for example, the allowable number of memory cells of unwritten state in a part.

Alternatively, the first constant may be set to any number equal to or less than the allowable number of memory cells of unwritten state in a part.

The second detection is performed when programming and the confirmation of a threshold value are not performed (Step ST3).

The second detection detects the number of memory cells of unwritten state in a page or a segment. When performing the detection in units of segments, the detection is performed with respect to all the segments of a page. Since the program data "0" means an unwritten state, the detection can be made by detecting the number of program data "0".

When the number of memory cells of unwritten state in a page or a segment is greater than a second constant, the sequence returns to Step ST1, again. When the number of memory cells of unwritten state is equal to or less than the second constant, the program operation is finished.

As used herein, the "second constant" is, for example, the allowable number of memory cells of unwritten state in a page, when the second detection is performed in units of pages. When the second detection is performed in units of segments, the second constant is, for example, the allowable number of memory cells of unwritten state in each segment. When the second detection is performed in units of pages, the second constant may be set to any number smaller than the allowable number of memory cells of unwritten state in a page. When the second detection is performed in units of segments, the second constant may be set to any number smaller than the allowable number of memory cells of unwritten state in a segment.

In this embodiment, the data held by the memory cells may be binary, ternary, or higher.

A feature of the present embodiment is that the first detection is performed for a part, a unit smaller than a page, concurrently with the programming and the confirmation of a threshold value, and that the programming and the confirmation of a threshold value are repeated until the number of memory cells of unwritten state becomes equal to or less than the first constant in a part.

With the number of memory cells of unwritten state in a part equal to or less than the first constant, it is likely that the number of memory cells of unwritten state in the program data is equal to or less than the second constant because of the programming proceeding with the first detection.

Accordingly, in the first second-detection, the number of memory cells of unwritten state will be likely to be equal to or less than the second constant. This eliminates the need for an unnecessary second detection, thereby reducing program time.

Second Embodiment

The following describes the Second Embodiment of the present invention with reference to the attached drawings. A nonvolatile semiconductor memory device according to the Second Embodiment has the same basic configuration as the nonvolatile semiconductor memory device according to the First Embodiment. The Second Embodiment is a program end detection method for a multi-level NAND flash memory that stores 2-bit or more data per cell. As an example of a multi-level NAND flash memory, the following description will be given through the case of a quaternary memory that stores 2 bits per cell. It should be noted that the present embodiment is also applicable to multi-level memories of 3 or higher bits per cell.

Figure 5:
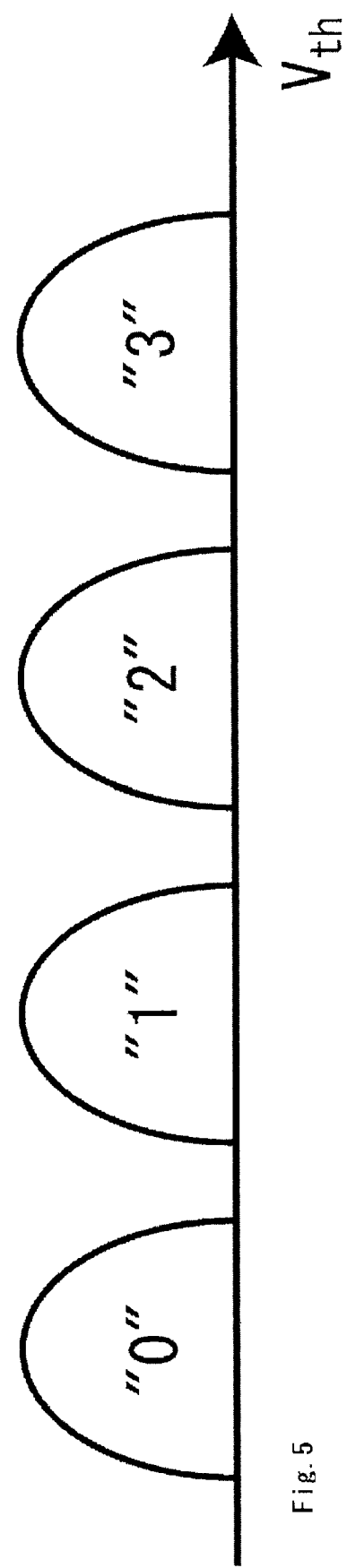
FIG. 5 is a threshold distribution graph representing when quaternary data is stored according to an exemplary embodiment of the present disclosure.

FIG. 5 represents a threshold distribution of when storing quaternary data. The erase state is level "0", and the program states are level "1", "2", and "3" in order of increasing threshold. In multi-level products, programming is generally performed in order of increasing threshold level. As such, the passing of the program detection of one threshold level is followed by the program and detection of a higher threshold level.

Figure 6:
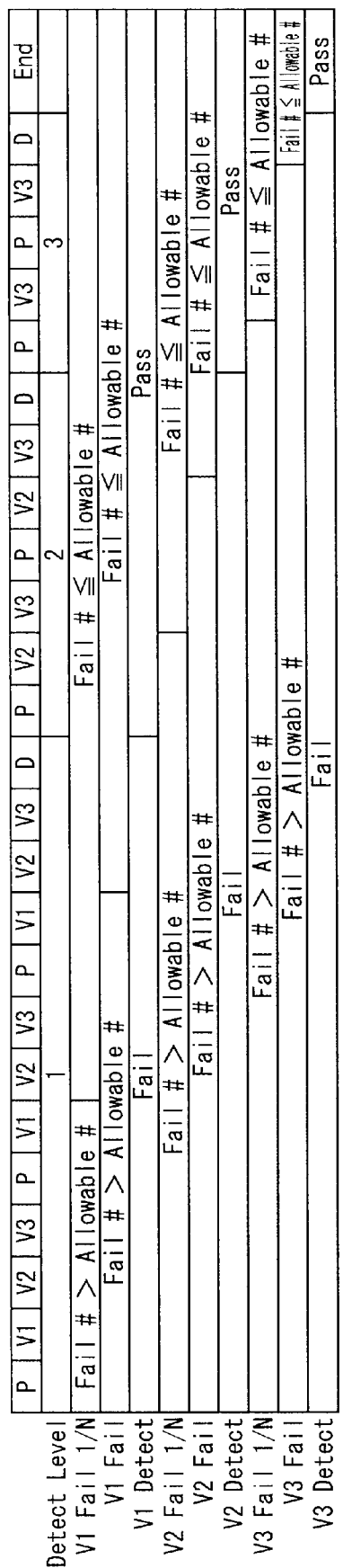
FIG. 6 is a chart describing program operation and a detection method of a multi-level product according to a second embodiment of the present disclosure.

The following describes the program operation and the detection method of a multi-level product according to the Second Embodiment, with reference to FIG. 6. In a programming, programming is performed for levels "1", "2", and "3", and a first detection is performed for level "1". The first detection is a detection for the memory cells in a part, a unit smaller than a page, as in the First Embodiment. The programming and the first detection for level "1" are repeated until the first detection is passed. When the result of the first detection for level "1" becomes equal to or less than the allowable number, a second detection is performed for level "1". The second detection detects the number of failures in a page or in a unit of correction (segment) due to the redundant region. When the result of detection is equal to or less than the allowable number, a "pass" is output as the result of the detection for level "1".

In a similar fashion, programming is performed for level "2" and higher levels, and the first detection is performed for level "2". The procedure is repeated until the number of detected failures becomes equal to or less than the allowable number. When the first detection for level "2" becomes equal to or less than the allowable number, the second detection is performed for level "2", and, when the result of detection is equal to or less than the allowable number, a "pass" is output as the result of the detection for level "2". Then, the first and second detections are also performed for level "3" in the same manner. The number of operations in this series of programming and detections is as follows: Seven program operations; three first detections for level "1"; five first detections for level "2"; seven first detections for level "3"; and a total of three second detections for "1", "2", and "3", one for each level. This embodiment is intended to improve the accuracy of detection operation.

Third Embodiment

The following describes the Third Embodiment of the present invention with reference to the attached drawings. A nonvolatile semiconductor memory device according to the Third Embodiment has the same basic configuration as the nonvolatile semiconductor memory device according to the Second Embodiment. In the Third Embodiment, in order to further increase the speed of the detection operation of the Second Embodiment, a third detection, instead of a first detection, is performed in the programming of lower threshold levels. The third detection is performed concurrently with the programming, and has a detection range of one page. The allowable number of failures is the number that takes into consideration a failure relief due to the redundant region, and is the same as the allowable number in the second detection method. The difference in this embodiment is that the first and second detections are performed for the highest threshold level.

Figure 7:
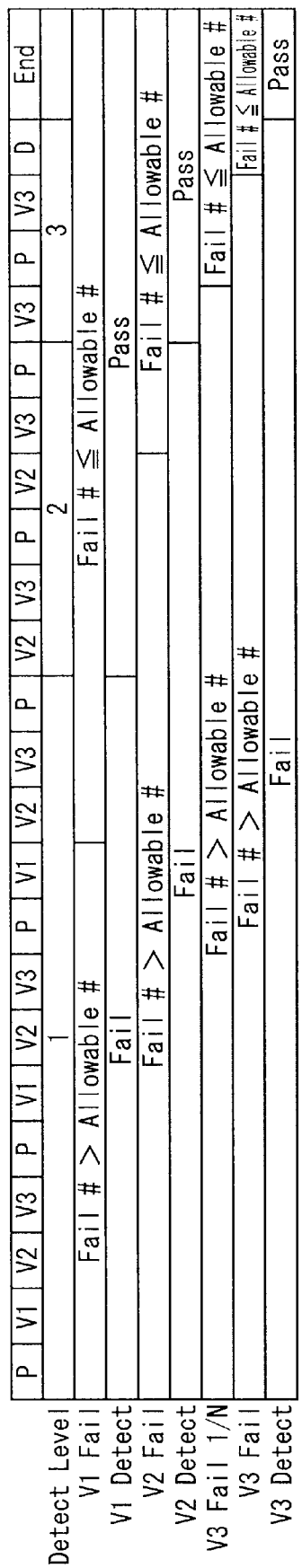
FIG. 7 is a chart describing program operation and a detection method of a multi-level product according to a third embodiment of the present disclosure.

Referring to FIG. 7, the following describes the program operation and the detection method for a multi-level product according to the Third Embodiment. First, in a programming, programming is performed for levels "1", "2", and "3", and a third detection is performed for level "1". When the allowable number of failures is equal to or less than a set value, programming for level "2" and higher levels, and a third detection for level "2" are then performed in the same manner. When the result of detection is equal to or less than the allowable number, a "pass" is output as the result of the detection for level "2". Specifically, a detection for one page is performed for level "1" and "2". Then, programming and first detection are performed for the highest threshold level, and the procedure is repeated until the number of detected failures becomes equal to or less than the allowable number. When the result of the first detection becomes equal to or less than the allowable number, a second detection is performed. When the result of the second detection is equal to or less than the allowable number, a "pass" is output as the result of the detection for level "2". The number of operations in this series of programmings and detections is as follows: Seven program operations; three first detections for level "1"; five first detections for level "2"; seven first detections for level "3"; and only one second detection, for level "3". The present embodiment is intended to increase the speed of detection operation and to improve accuracy.

Fourth Embodiment

The Fourth Embodiment of the present invention is described below with reference to the attached drawings. A nonvolatile semiconductor memory device according to the Fourth Embodiment has the same basic configuration as the nonvolatile semiconductor memory device according to the Third Embodiment. The difference in this embodiment is that only a first detection is performed for all levels, in order to further increase the speed of the detection operation of the Third Embodiment.

Referring to FIG. 8, the following describes the program operation and the detection method for a multi-level product according to the Fourth Embodiment. First, in a programming, programming is performed for levels "1", "2", and "3", and the first detection is performed for level "1". The first detection is a detection for the memory cells in a part, a unit smaller than a page, as in the First Embodiment. The programming and the first detection for level "1" are repeated until the first detection is passed. When the result of the first detection for level "1" becomes equal to or less than the allowable number, programming for level "2" and higher levels, and the first detection for level "2" are performed without a second detection for level "1", and the procedure is repeated until the number of detected failures becomes equal to or less than the allowable number. When the result of the first detection for level "2" becomes equal to or less than the allowable number, the first detection is then performed for level "3" in the same manner, without performing the second detection for level "2". The number of operations in this series of programming and detections is as follows: Seven program operations; two first detections for level "1"; four first detections for level "2"; six first detections for level "3"; and zero second detection. The present embodiment is intended to increase the speed of detection operation. It is required, however, to preset a low value for the allowable number of failures in the first detection.

Fifth Embodiment

The Fifth Embodiment of the present invention is described below with reference to the attached drawings. A nonvolatile semiconductor memory device according to the Fifth Embodiment has the same basic configuration as the nonvolatile semiconductor memory device according to the Fourth Embodiment. The difference in this embodiment is that, in order to further improve the accuracy of the detection operation of the Fourth Embodiment, only the first detection is performed for lower threshold levels, and the second detection, in addition to the first detection, is performed for the highest threshold level.

Figure 9:
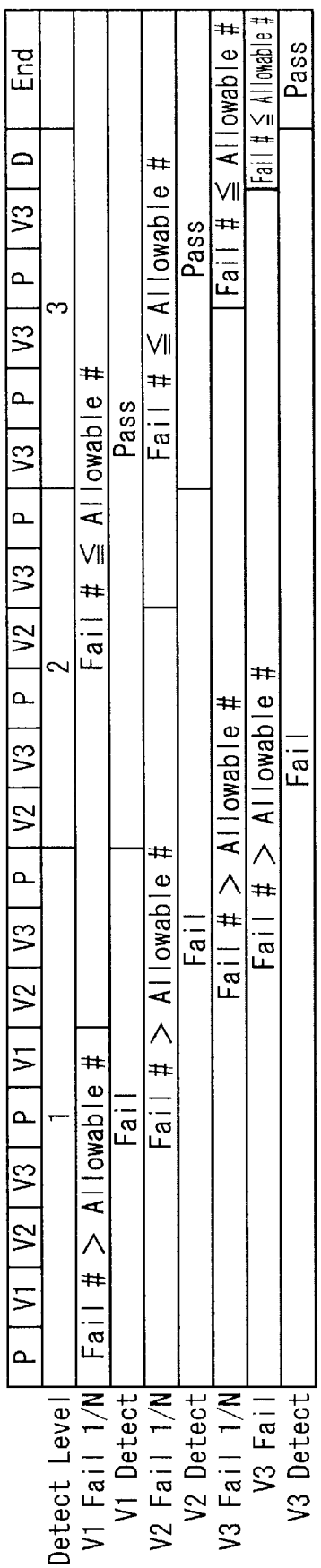
FIG. 9 is a chart describing program operation and a detection method of a multi-level product according to a fifth embodiment of the present disclosure.

Referring to FIG. 9, the following describes the program operation and the detection method for a multi-level product according to the Fifth Embodiment. First, in a programming, programming is performed for levels "1", "2", and "3", and a first detection is performed for level "1". The first detection is a detection for the memory cells in a part, a unit smaller than a page, as in the First Embodiment. The programming and the first detection for level "1" are repeated until the first detection is passed. When the result of the first detection for level "1" becomes equal to or less than the allowable number, programming for level "2" and higher levels, and the first detection for level "2" are performed, without performing a second detection for level "1", and the procedure is repeated until the number of detected failures becomes equal to or less than the allowable number.

When the result of the first detection for level "2" becomes equal to or less than the allowable number, the first detection is then performed also for level "3", without performing the second detection for level "2". When level "3" is the highest threshold level, the second detection is performed when the result of the first detection is equal to or less than the allowable number. The number of operations in this series of programming and detections is as follows: Seven program operations; two first detections for level "1"; four first detections for level "2"; and six first detections and one second detection for level "3". The present embodiment is intended to increase the speed of detection operation, and to improve accuracy.

FIG. 10 summarizes the number of program operations and detections of the Second through Fifth Embodiments. Even though the descriptions of the all embodiments are based on NAND flash memory, any memory cells are applicable provided that they perform program operations on a page- or program unit-basis in the memory cell array. The present invention proposes a technique to reduce program time through optimization of the end detection method for the program operation. The present invention described above with respect to certain examples is not limited to the foregoing embodiments, and can be implemented through modification of each constituting element to the extent that it does not depart from the substance of the present invention. Further, the present invention can be realized in various forms by appropriately combining more than one constituting element disclosed in the embodiments above. For example, some of the constituting elements may be deleted from the entire set of constituting elements disclosed in the foregoing embodiments, or the constituting elements of different embodiments may be appropriately combined.

What is claimed is:

1. A nonvolatile semiconductor memory device comprising:
   a memory cell array provided to perform programming in page units; and
   a control circuit provided to control the programming, the control circuit configured to perform a first detection for memory cells in a part provided as a unit smaller than a page, concurrently with programming to memory cells to be written in a page; and means that subjects the memory cells in the page to a second detection that takes into consideration a failure relief due to a redundant region, when the number of memory cells of unwritten state in the part as detected by the first detection becomes equal to or less than a first constant, and that ends the programming when the number of memory cells of unwritten state in the page becomes equal to or less than a second constant.

2. A nonvolatile semiconductor memory device according to claim 1, wherein the part is a collection of memory cells selected from the memory cells in the page at intervals of n memory cells, where n is any natural number.

3. A nonvolatile semiconductor memory device according to claim 1, wherein the part is a collection of memory cells randomly selected from the memory cells in the page.

4. A nonvolatile semiconductor memory device according to claim 1, wherein the part is a selected one of a plurality of divided data regions in the page.

5. A nonvolatile semiconductor memory device according to claim 1, wherein the part is a plurality of data regions selected from a plurality of divided data regions in the page.

* * * * *